United States Patent [19]
Qian

[11] Patent Number: 6,024,144
[45] Date of Patent: Feb. 15, 2000

[54] ROUTER WITH DUST SUCTION HOOD

[75] Inventor: Yuejun Qian, Idstein, Germany

[73] Assignee: Black & Decker Inc., Newark, Del.

[21] Appl. No.: 09/199,652

[22] Filed: Nov. 25, 1998

Related U.S. Application Data

[63] Continuation of application No. 08/978,129, Nov. 25, 1997, Pat. No. 5,845,688, which is a continuation of application No. 08/811,328, Mar. 4, 1997, abandoned, which is a continuation of application No. 08/505,499, Jul. 21, 1995, abandoned.

[30] Foreign Application Priority Data

Jul. 21, 1994 [DE] Germany .............................. 44 26 717

[51] Int. Cl.⁷ .................................................. B27G 21/00
[52] U.S. Cl. .................................. 144/252.1; 144/252.2; 409/137
[58] Field of Search ............................ 144/252.1, 252.2, 144/251.1, 251.2; 409/137, 182; 451/453, 456

[56] References Cited

U.S. PATENT DOCUMENTS

| | | |
|---|---|---|
| 2,527,968 | 10/1950 | Sherman et al. . |
| 3,837,383 | 9/1974 | Ko . |
| 3,935,678 | 2/1976 | Marton . |
| 3,987,589 | 10/1976 | Marton . |
| 4,397,342 | 8/1983 | North .................................. 144/252.1 |
| 4,738,571 | 4/1988 | Olson et al. . |
| 4,750,536 | 6/1988 | Grisley ................................. 144/252.1 |
| 4,805,353 | 2/1989 | Keith et al. . |
| 4,813,462 | 3/1989 | Linn ..................................... 144/252.1 |
| 4,821,365 | 4/1989 | Charters ............................... 144/252.1 |
| 4,946,322 | 8/1990 | Colligan . |
| 4,986,703 | 1/1991 | Hampl et al. ............................. 409/131 |
| 5,024,562 | 6/1991 | Arai et al. . |
| 5,031,678 | 7/1991 | Remmele et al. ................... 144/252.1 |
| 5,381,842 | 1/1995 | Aigner ................................. 144/251.2 |
| 5,845,688 | 12/1998 | Qian ..................................... 144/252.1 |

FOREIGN PATENT DOCUMENTS

| | | |
|---|---|---|
| 126853 | 12/1984 | European Pat. Off. . |
| 2386361 | 11/1978 | France . |
| 679585 | 8/1939 | Germany . |
| 1948940 | 5/1971 | Germany . |
| 2335177 | 2/1974 | Germany . |
| 3923829 | 1/1991 | Germany . |
| 4218247 | 12/1992 | Germany . |
| 1176031 | 1/1970 | United Kingdom . |
| 1178744 | 1/1970 | United Kingdom . |
| 2012043 | 7/1979 | United Kingdom . |
| 1602263 | 11/1981 | United Kingdom . |
| 2060484 | 5/1991 | United Kingdom . |
| WO 84/01320 | 4/1984 | WIPO . |

*Primary Examiner*—Eugene L. Kim
*Attorney, Agent, or Firm*—Harness, Dickey & Pierce, P.L.C.

[57] ABSTRACT

A device for cutting a workpiece by means of a rotatingly driven tool bit has a suction hood surrounding the tool bit in annular manner with a through-opening for the tool bit to pass through. The suction hood forms a suction duct open to the tool bit which is limited by an outer wall. At least a part of the outer wall is curved in a perpendicular plane in the form of a parabola, and the focal point of the parabola lies beneath the workpiece engagement surface formed by the suction hood. Because of this parabola shape, chips thrown by the tool bit against the outer wall are reflected essentially parallel to the workpiece engagement surface and thus do not escape up through the through-opening.

16 Claims, 4 Drawing Sheets

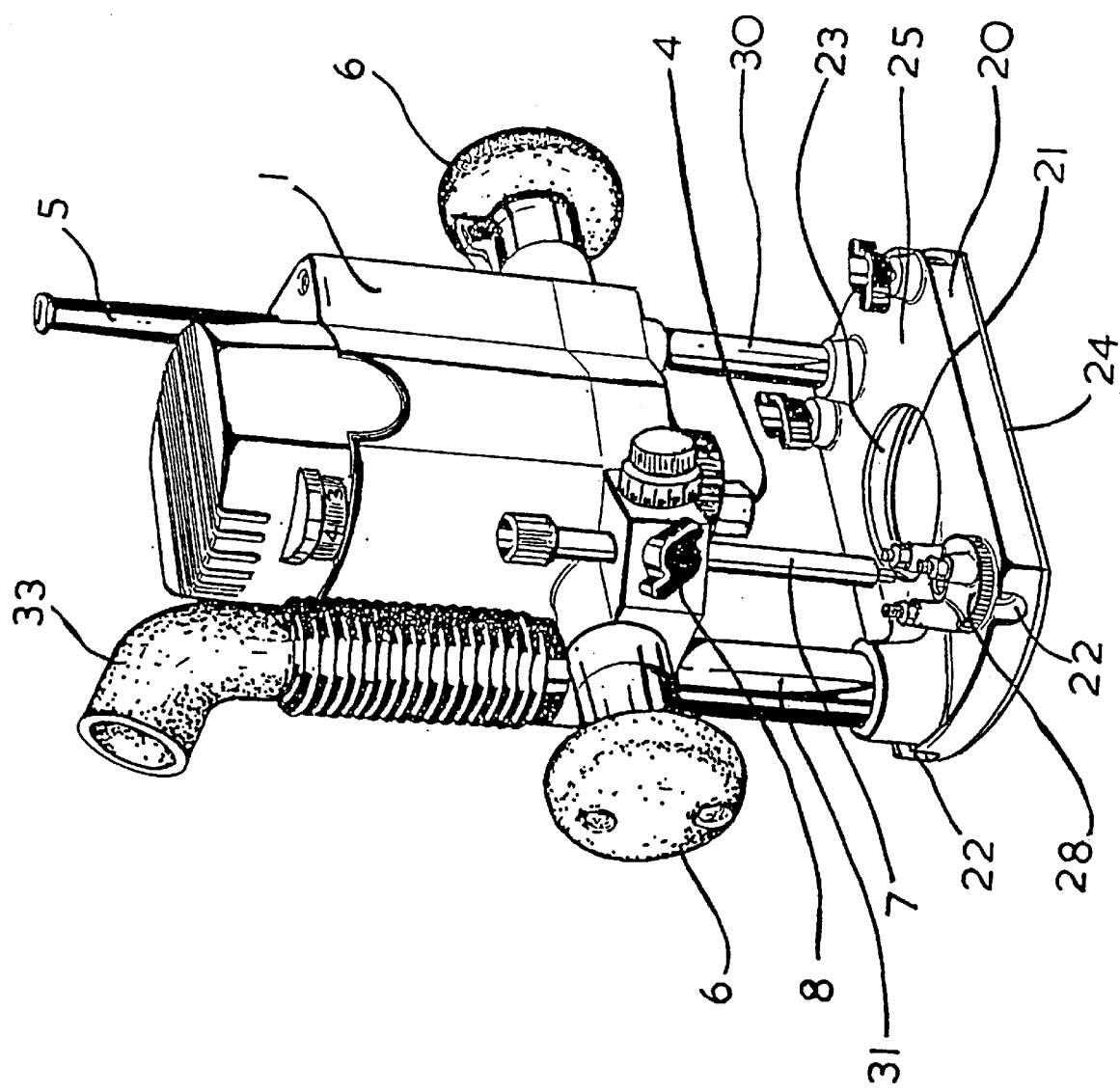

ROUTER WITH DUST SUCTION HOOD

This is a continuation of U.S. patent application Ser. No. 08/978,129 now U.S. Pat. No. 5,845,688 filed Nov. 25, 1997, which is a continuation of application Ser. No. 08/811, 328 now abandoned filed Mar. 4, 1997, which is a continuation of application Ser. No. 08/505,499 now abandoned filed Jul. 21, 1995.

BACKGROUND OF THE INVENTION

The invention relates to a device, particularly a router, for cutting a workpiece by means of a tool bit rotatingly driven in working rotation direction, with a suction hood surrounding the tool bit in annular manner and having a workpiece engagement surface, which has a through-opening for the tool bit to pass through, whose clear width is a multiple of the diameter of the tool bit and which forms a suction duct open to the tool bit, which is limited by an outside wall, in which at least a part-zone of the outer wall is curved at least over a part of the circumference of the through-opening in a plane which runs parallel to the rotation axis of the tool bit and intersects the outer wall at two points spaced from each other.

With a known device of this type (U.S. Pat. No. 4,946, 322) a cup-shaped suction hood open at the top and bottom is arranged about the rotatingly driven tool bit, said suction hood has a curved, upwardly widening outer wall, between which and a correspondingly shaped inner wall compressed air is fed, while there is a suction connection at the upper end of the suction hood. With this suction hood, the chips which are generated during the machining of the workpiece and the dust from the machining area are moved upwards and sucked away out of the inside zone of the suction hood. This requires an essentially closed top of the inner space of the suction hood, with the result that the operator's view of the machining area of the workpiece is blocked. The known suction hood is also extremely bulky and in addition operates with compressed air to effect the removal of the dust by suction.

With another known device (U.S. Pat. No. 5,031,678) the rotatingly driven tool bit is surrounded by a suction hood whose outer wall is rectilinearly inclined, at least in a part-zone, from the bottom upwards and in the direction of the rotation axis of the tool bit. A tubular suction duct joins on to this suction hood. When, with this known suction hood, chips are thrown against the inclined outer wall by the rotating tool bit, they can be reflected in the direction of the tool bit and in particular in the direction of the machining point of the workpiece. This can lead to chips and dust not being sucked out efficiently, but escaping through the groove in the workpiece created by the tool bit. In order to avoid this, a brush is therefore provided which extends into the manufactured groove and forms a barrier to the escape of chips and dust.

With another device (German Patent Application P 23 35 177) in the form of a hand-held sanding machine with rotatingly driven sanding plate, the outer wall of the dust-suction hood which surrounds the sanding area laterally is curved, with the result that sections of the outer wall which are situated above the sanding plate lie radially further inward than sections situated in the peripheral zone of the sanding plate. The suction hood is essentially completely closed at the top, with the result that the dust which has formed is retained inside the suction hood and is removed only through connected suction hoses. The curvature of the outer wall clearly serves merely to stabilise the total structure.

SUMMARY OF THE INVENTION

The object of the invention is to develop the suction hood of a device for cutting a workpiece so that as unimpeded as possible a view of the machined area of the workpiece is provided with a simple structure, without the risk of chips detached from the workpiece by the rotating tool bit being thrown out upwards through the through-opening of the suction hood.

To achieve this object, a device of the type mentioned initially is designed in such a way according to the invention that the part-zone of the outer wall of the suction hood has a parabolic curve and the focal point of the parabola is located between outer wall sections lying opposite each other and at a lesser distance from the plane of the workpiece engagement surface than from the plane of the surface of the suction hood lying opposite this.

The effect of the shape of the outer wall of the suction hood is that chips which are generated in the focal point of the parabola and in its vicinity are reflected essentially horizontally, i.e. parallel to the workpiece engagement surface, upon striking the parabolic outer surface, and thereby remain inside the zone of the suction hood and neither escape upwards through the through-opening of the suction hood nor enter the engagement area of the tool bit with the workpiece. In this way, the operator is protected against injury and the work environment is polluted with less dust and fewer chips.

The parabolic curve defines a plurality of parabolas in the circumferential direction. Each parabola defines a parabola plane extending tangentially to a circle lying concentrically about the rotation axis of the tool bit. The tangent contact point between each parabola plane and the circle is adjacent to the portion of the tool bit that in operation moves in the direction of the outer wall having the associated parabola. The focal point of each parabola lies on the contact point of its associated parabola plane and circle.

The effect of such a structure of the outer surface running in circumferential direction about the tool bit is that the chips of the workpiece produced by the tool bit during operation move essentially in the parabola plane in the direction of the outer wall, to which end the circle is preferably equal to the cutting circle of the tool bit, but which for the sake of simplicity and with sufficient accuracy for practical purposes is generally assumed to have a diameter of 10 mm.

The focal point of the parabola is preferably situated outside the area limited by said planes, i.e. beneath the workpiece bearing surface and preferably at a distance equal to the projection of the tool bit beneath the workpiece engagement surface. In this position, the focal point lies in the engagement area of the tool bit with the workpiece and thus in the area in which the chips form. In practice a position of 20 mm below the workpiece engagement surface appears appropriate in view of the different amounts by which workpieces project in practice.

In a preferred version, the device according to the invention has a conventional suction channel joining on to the suction duct and connectable to an underpressure source, in order to remove the chips and the dust from the machining zone. With such a structure, at least a part of the circumference of the outer wall of the suction hood increases its distance in the form of a spiral from the rotation axis of the tool bit in work rotation direction of the tool bit in a particularly preferred manner. As a result, on the one hand the course of the suction duct from the zone of the outer wall running essentially concentrically relative to the rotation axis of the tool bit to the suction channel is adapted to the flow around the tool bit resulting from the rotation of the tool bit, and thus to the corresponding direction of flight of the chips, while on the other hand the effect of the spiral-shaped structure is that chips which would be reflected against the tool bit if the structure were in the form of a circle can now pass by it.

The transition from outer wall increasing its distance in the form of a spiral from the rotation axis of the tool bit to the wall of the suction channel preferably takes place tangentially.

BRIEF DESCRIPTION OF THE DRAWINGS

The invention is described in more detail below with reference to the drawings showing an embodiment.

FIG. 1 shows a router in perspective representation.

DETAILED DESCRIPTION OF THE PREFERRED EMBODIMENT

Figure 3:
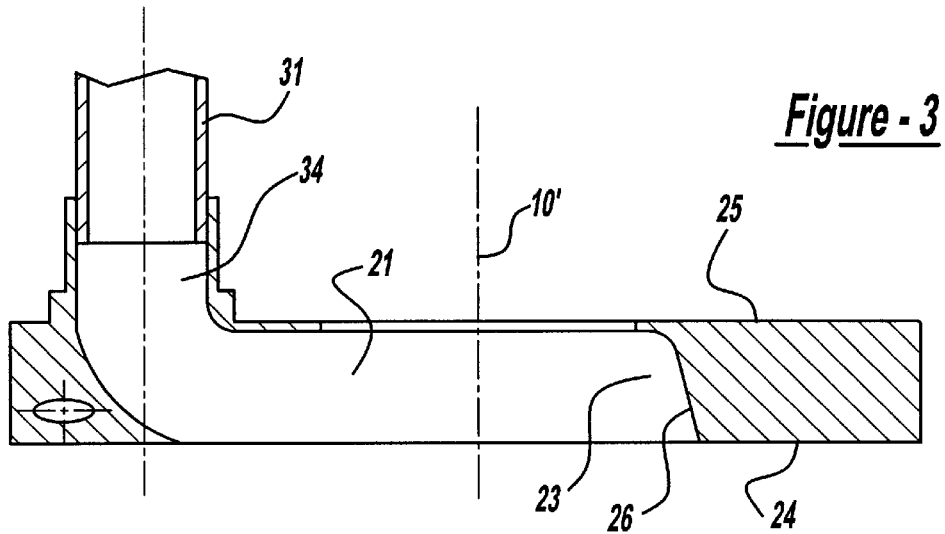
FIG. 3 shows a section along the line III—III from FIG. 2.

The router shown in FIG. 1 has a cutting head 1, in which the customary, not represented electric motor is situated. The lower end of the spindle of the electric motor is designed in conventional manner as a tool holder 4 into which for example a shank cutter 10 (FIGS. 6 and 7) can be inserted. A connecting cable, not represented, which is guided into the cutting head 1 through a strengthening bush 5, serves to power the electric motor.

Arranged at the cutting head 1 is a depth-adjustment rod 7 which is fixed at a desired height by means of a clamping screw 8. Customary handles 6 are also found on the side of the cutting head 1, one of which generally co-operates with a clamping device in order to fix the cutting head 1 in clamping manner at a desired height at the associated guide column.

The cutting head is held displaceable at guide columns 30, 31 which are secured with their lower ends in a suction hood 20 forming a base plate. The suction hood 20 has a through-opening 21 which is essentially central relative to the rotation axis of the spindle of the electric motor and thus the rotation axis of the tool holder 4, with the result that a cutter 10 or the like inserted into the tool holder 4 can be brought into engagement, by lowering the cutting head 1 through the through-opening 21, with the workpiece 11 to be machined (FIG. 6) on which the suction hood 20 usually rests wholly or partly with its lower surface 24, with the result that the surface 24 forms a workpiece engagement surface. As can be seen, the diameter of the through-opening 21 is much greater than the diameter of a customary used tool bit, so that the operator has a clear view of the working area of the tool bit 10 through the through-opening 21.

Arranged on the top 25 of the cover hood 20 adjacent to the guide column 31 is a conventional turntable 28 which carries several depth stops set at various heights which co-operate with the depth-adjustment rod 7, with the result that the operator can lower the cutting head 1 to a selected, predetermined depth. Passage bores 22 allow the customary positioning of the suction hood 20 and thus of the whole router on guide rods which are not represented.

The suction hood 20 has an upper wall forming the upper surface 25 and a lower wall forming the workpiece engagement surface 24, between which is formed an suction duct 23, surrounding the passage opening 21 and open to the latter, which is limited radially outwards by an outer wall 26.

As described in detail in the earlier German Patent Application P 44 07 420.4, the guide column 31, which has a greater diameter than the guide column 30, is designed as a hollow tube with a circular cross-section which is open at both ends. The lower end of the guide column 31 is firmly connected to this via a projection of the suction hood 20, so that its inside 36 is connected to the suction duct 23 via a connecting duct 34. Connected to the upper end of the guide column 31 is a suction pipe 33 to which for example a dust-suction device or the like can be connected.

Figure 4:
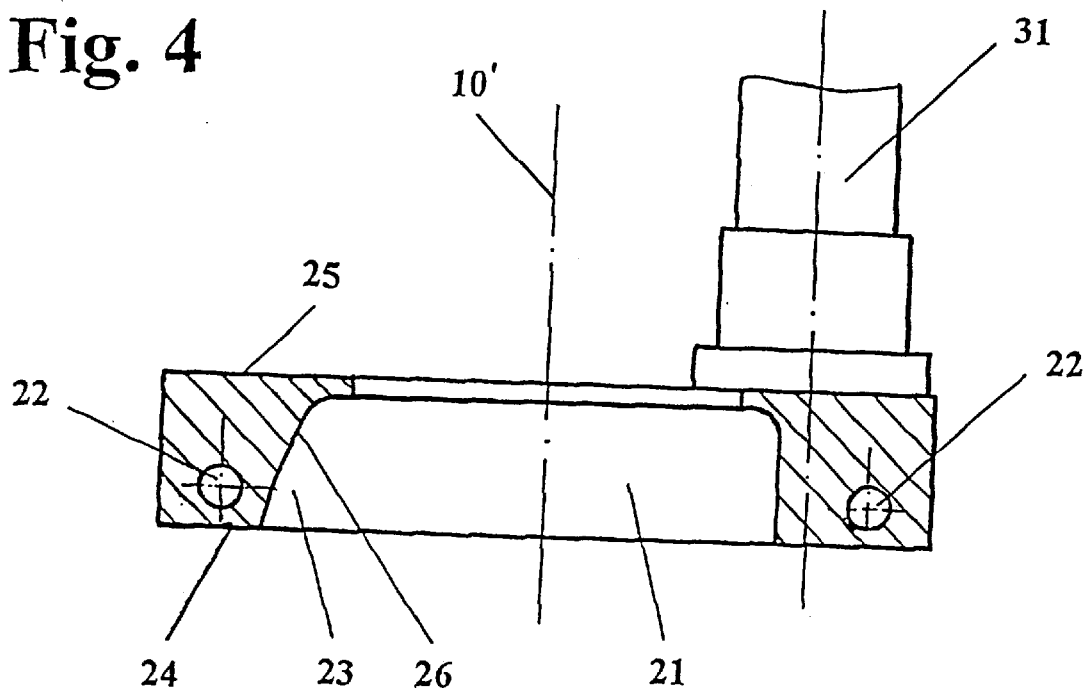
FIG. 4 shows a section along the line IV—IV from FIG. 2.
Figure 5:
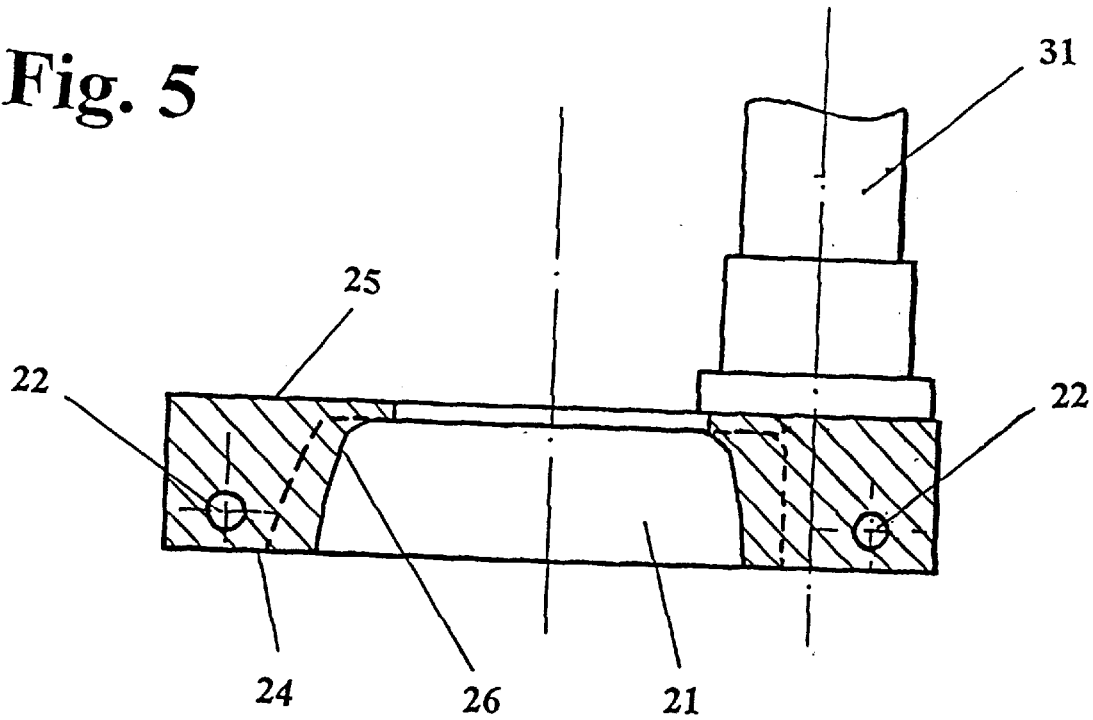
FIG. 5 shows a section along the line V—V from FIG. 2.
Figure 6:
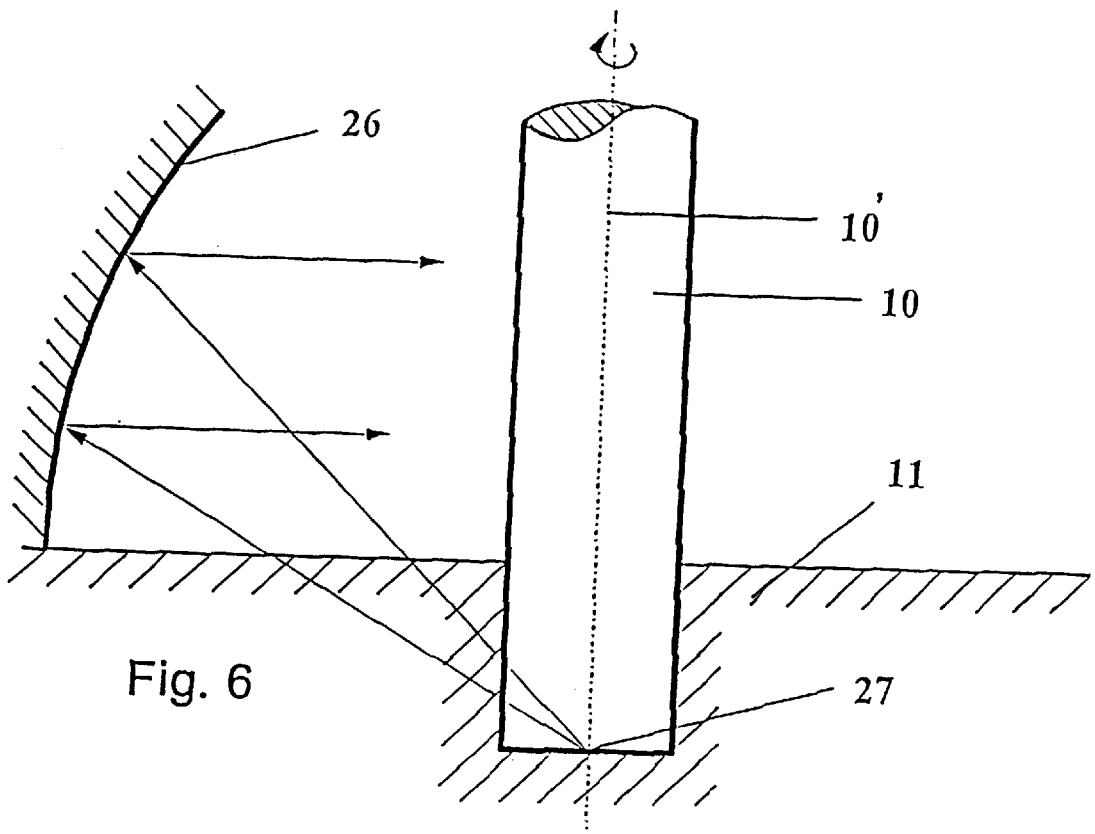
FIG. 6 shows in a diagrammatic representation the co-operation of cutting tool bit and outer wall of the suction duct of the suction hood.
Figure 7:
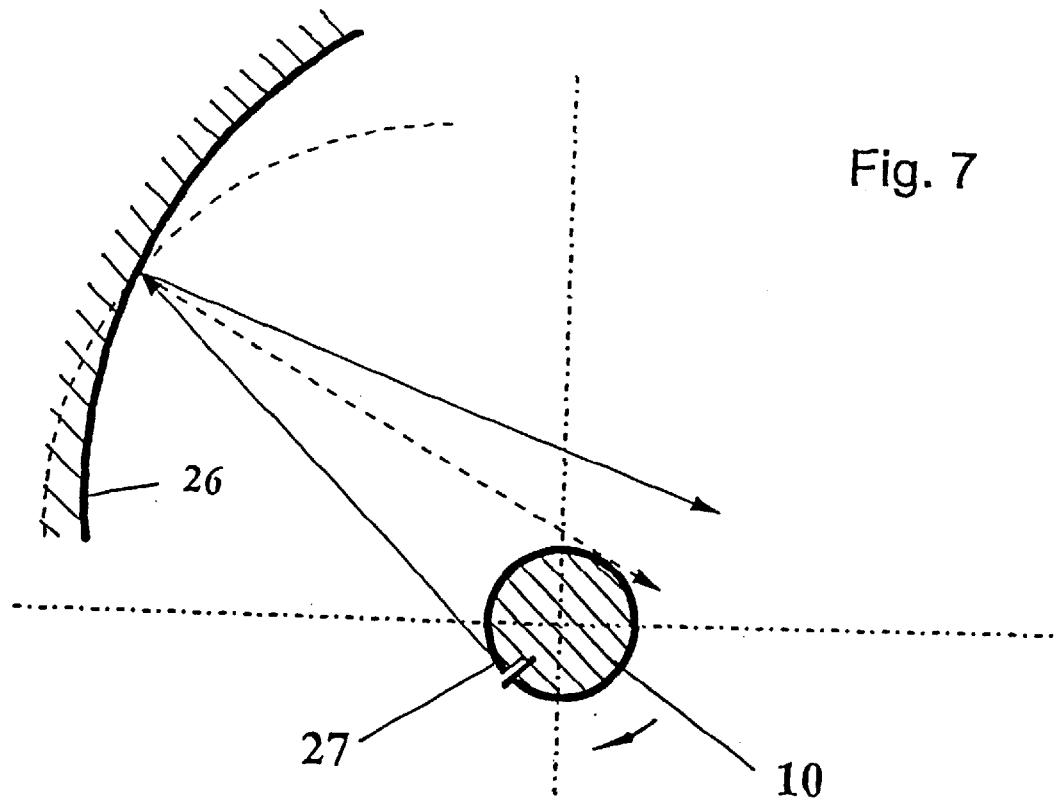
FIG. 7 shows in a diagrammatic representation the co-operation of tool bit and spiral-shaped course of the outer wall of the suction duct of the suction hood.

As is to be deduced from FIGS. 3 to 5 in particular, the outer wall 26 of the suction duct 23 has a parabolic curvature over a large part of the circumference in the perpendicular section according to FIGS. 3 to 5, whereby the focal point 27 of the parabola in question lies, in the embodiment represented, beneath the workpiece engagement surface 24, namely at the lower end of the shank cutter 10, and, as shown in FIG. 6, on a tangent corresponding to the parabola plane to the cutting circle of the shank cutter 10 and in the contact point with the cutting circle. The outer wall 26 is shaped in such a way that all parabolic wall sections lie with their focal point corresponding to the represented focal point 27 on a tangent formed by their parabola plane to the cutting circle and in contact with the latter. If therefore, as indicated by the arrows in FIG. 6, chips detached by the shank cutter 10 from the workpiece 11 are thrown in the direction of the outer wall 26 of the suction duct 23, these chips come from a zone closely adjacent to focal points of the parabolas determining the curvature of the outer wall 26. The chips are therefore reflected at the outer wall 26 essentially into the horizontal, i.e. parallel to the workpiece engagement surface 24 and not, as would be the case for example with a vertically running outer wall, upwards out of the through-opening 21.

Figure 2:
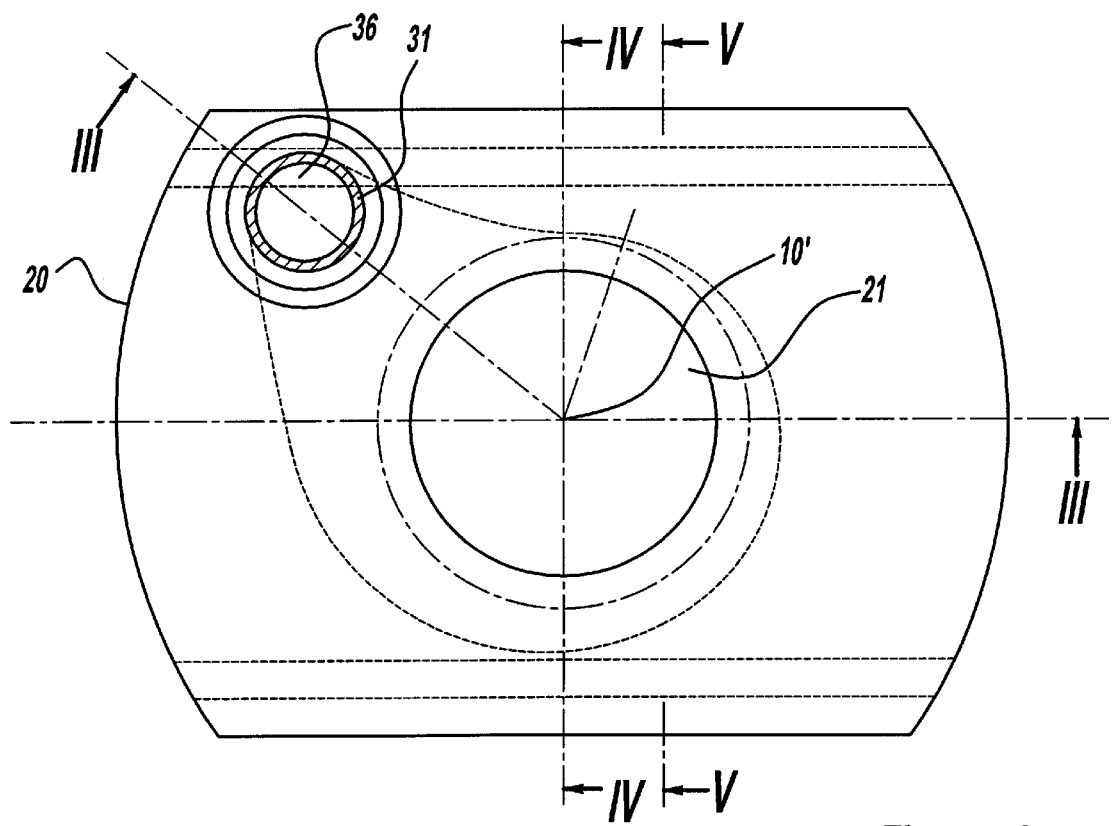
FIG. 2 shows a diagrammatic plan view of the suction hood of the router from FIG. 1, parts and zones from FIG. 1 which are not necessary for comprehension having been omitted.

As indicated in particular in FIG. 2, the outer wall 26 runs essentially in the form of a spiral about the rotation axis 10' of the tool bit 10, the transitions to the inside space 36 of the guide column 31 differing from the spiral-shaped course and in particular, as FIG. 2 shows, there is a tangential transition into the inside space 36 at the end of the outer wall 26 lying downstream.

As a result of the spiral-shaped course, the flow produced by the rotation of the cutter 10, which rotates clockwise in the representation according to FIG. 2, which flow corresponds to a ventilator flow, is exploited in order to improve the outward suction of chips. In addition, as indicated by the solid arrows shown in FIG. 7, the effect of such a reflection of the chips at the outer wall 26 having the form of a spiral is that chips tangentially thrown outwards by the tool bit 10 are reflected at the outer wall 26 at such an angle that their path of motion in the direction of the tool bit 10 passes by the latter. If the outer wall followed a circular-shaped course concentrically about the rotation axis 10' of the tool bit 10, indicated by a broken line in FIG. 7, then, as indicated by the broken-line arrow, reflected chips could strike the tool bit 10 and thus be thrown uncontrollably into the surrounding area.

I claim:

1. A router comprising:

a head for driving a tool bit about an axis;

a first and second guide columns, said head being displaceable on said first and second guide columns;

a suction hood supporting said first and second guide columns, said suction hood including an opening for receiving the bit for engagement with a workpiece, and said suction hood having a surface for engagement with a workpiece;

a suction duct formed within the hood;

an exhaust port connected to the suction duct for exhausting dust from the suction hood;

one of said guide columns defining said exhaust port, said exhaust port coupled with said suction duct for exhausting debris at said suction hood opening; and a parabolic surface within the suction duct for reflecting dust from the bit toward the exhaust port.

2. The router according to claim 1, wherein said guide column channel being coupled with a suction device.

3. The router according to claim 1, wherein said guide column defining said exhaust port has a larger cross-sectional area than said other guide column.

4. The router according to claim 1, wherein a connecting duct is positioned between said suction duct and said exhaust port.

5. The router according to claim 1, wherein said parabolic surface circumferentially follows a spiral path.

6. The router according to claim 1, wherein a focal point for the parabolic surface is positioned substantially at a tip of the tool bit.

7. The router according to claim 2, wherein said exhaust port is positioned at an end of said spiral path.

8. The router according to claim 1, wherein said parabolic surface reflect particles in a substantially horizontal direction.

9. The router according to claim 1, wherein said parabolic surface reflects particles which pass by the tool bit to said exhaust port.

10. The router according to claim 2, said exhaust port is positioned at a tangential transition of said spiral wall.

11. A router comprising:

a cutter head;

a first and second guide columns, said cutter head being displaceable on said first and second guide columns;

a suction hood supporting said first and second guide columns, said suction hood including an opening for receiving a tool bit coupled with said cutter head, and a suction duct in said suction hood adjacent said opening; and one of said guide columns defining an exhaust port, said exhaust port coupled with said suction duct for exhausting debris at said suction hood opening.

12. The router according to claim 11, wherein said exhaust port being coupled with a suction device.

13. The router according to claim 11, wherein said suction duct defined by a parabolic surface, said parabolic surface directing debris to said exhaust port.

14. The router according to claim 11, wherein said guide column defining said exhaust port has a larger cross-sectional area than said other guide column.

15. The router according to claim 11, wherein a suction pipe being coupled with said guide column exhaust port for enabling connection of a suction device.

16. The router according to claim 11, wherein a connecting duct is positioned between said suction duct and said exhaust port.

* * * * *